United States Patent [19]
Mullender et al.

[11] 3,879,242
[45] Apr. 22, 1975

[54] BELT COVERING APPARATUS

[75] Inventors: Claude Mullender, Barberton; Norman E. Reinhart, Cuyahoga Falls, both of Ohio

[73] Assignee: The B. F. Goodrich Company, New York, N.Y.

[22] Filed: Aug. 13, 1973

[21] Appl. No.: 387,670

Related U.S. Application Data

[62] Division of Ser. No. 204,931, Dec. 6, 1971, Pat. No. 3,775,221.

[52] U.S. Cl. ............... 156/137; 156/184; 156/204; 156/244
[51] Int. Cl. ............................................ B29d 27/00
[58] Field of Search .......... 156/137, 140, 141, 184, 156/190, 191, 192, 199, 202, 204, 213, 214, 216, 230, 231, 244, 258, 267, 299, 300, 301, 302, 324; 242/67, 3, 56.9, 79; 117/11 R; 74/232, 233, 231 R, 231 P; 264/284, 210 R

[56] References Cited
UNITED STATES PATENTS

| | | | |
|---|---|---|---|
| 2,439,043 | 4/1948 | Evans | 156/460 |
| 2,696,865 | 12/1954 | Seiler | 156/202 |
| 3,193,425 | 7/1965 | Holdsworth | 156/202 |
| 3,217,555 | 11/1965 | Brooksbank | 156/202 |
| 3,489,630 | 1/1970 | Katz et al | 156/202 |
| 3,567,151 | 3/1971 | Williams | 242/79 |
| 3,711,348 | 1/1973 | Reschke | 156/137 |

*Primary Examiner*—Douglas J. Drummond
*Assistant Examiner*—F. Frisenda
*Attorney, Agent, or Firm*—Joseph Januszkiewicz; W. A. Shira, Jr.

[57] ABSTRACT

A method of fabricating a belt wherein a belt carcass is shuttled back and forth between a pair of storage reels, one of which is pivoted after the first pass to invert the carcass, with extruder means in line with the pass line of the carcass such that covering material is fed continuously from the extruder directly onto the upper and then the lower surfaces of a belt carcass. Such carcass and covering are joined together by laminating the covering to the carcass without interruptions.

4 Claims, 15 Drawing Figures

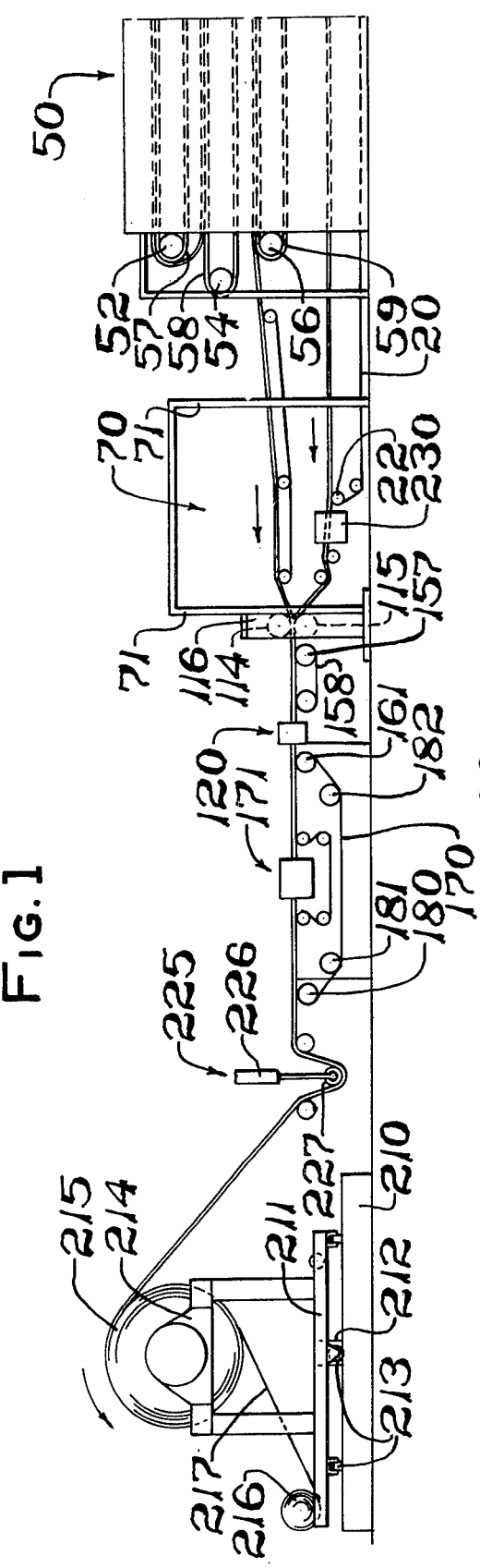
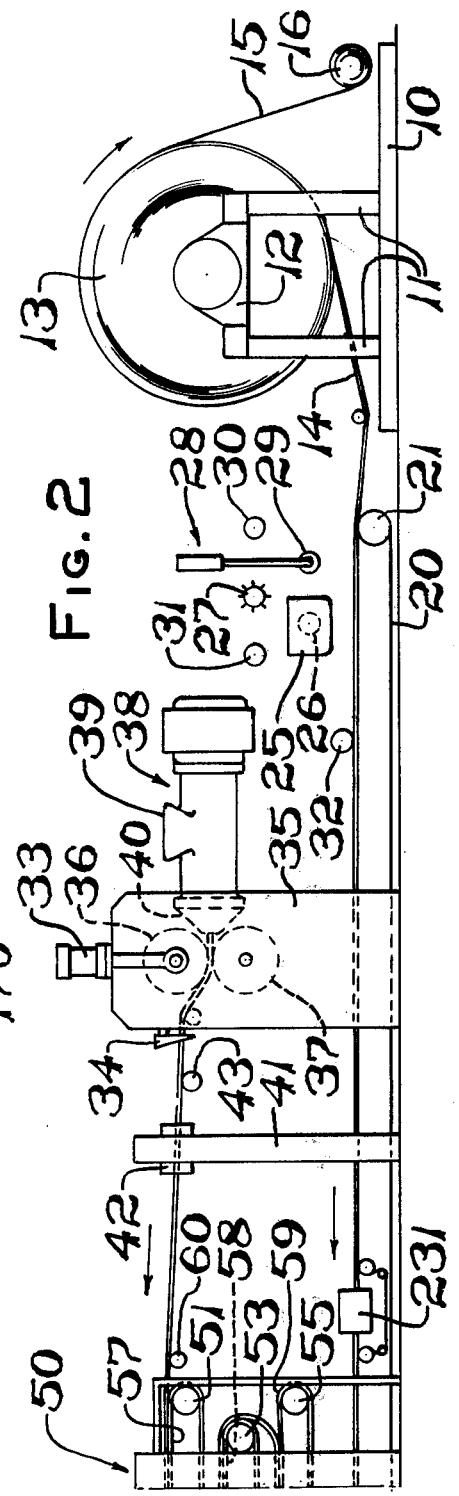
Fig. 1
Fig. 2

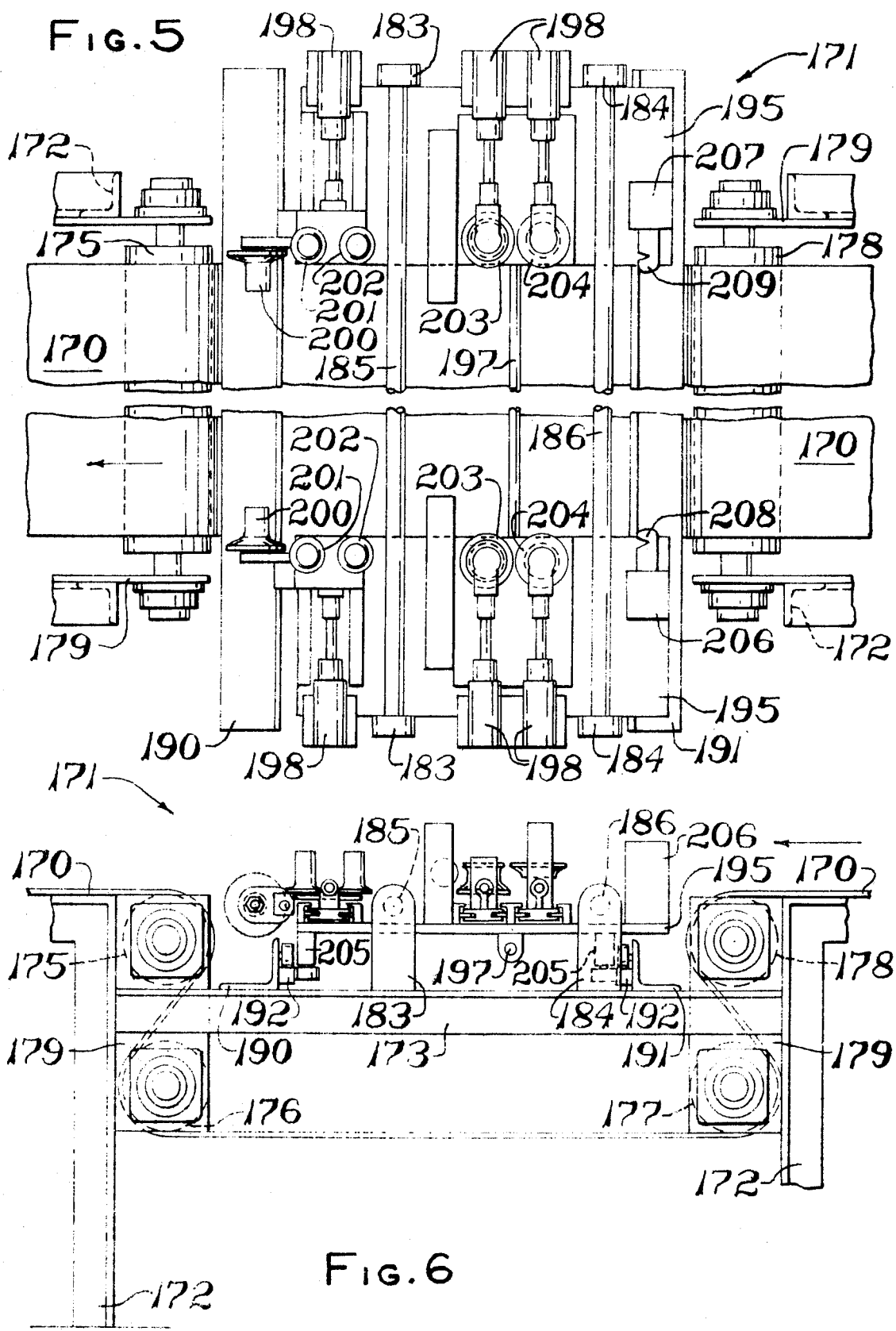

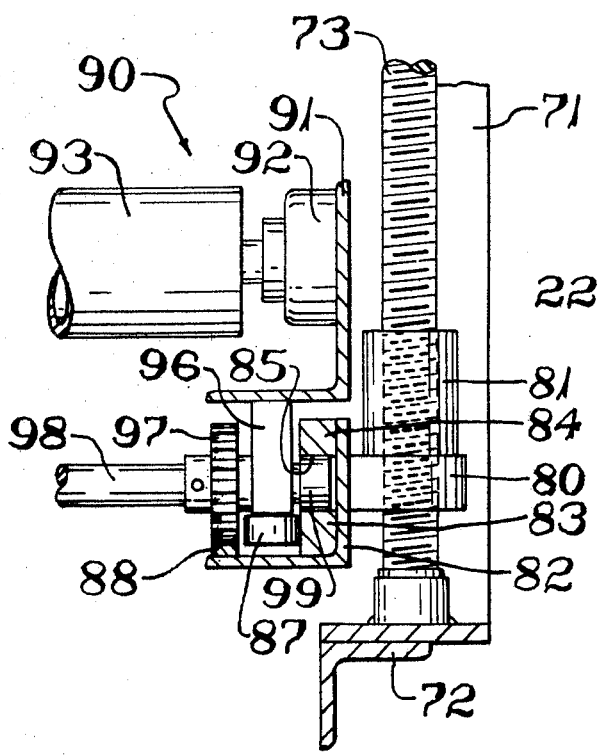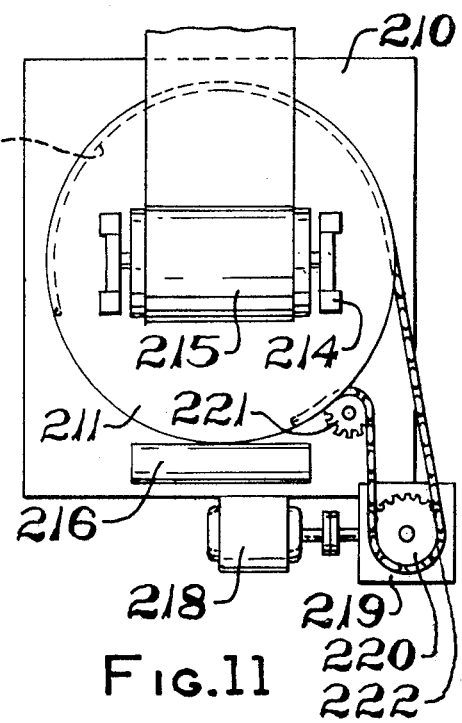
Fig.10     Fig.11
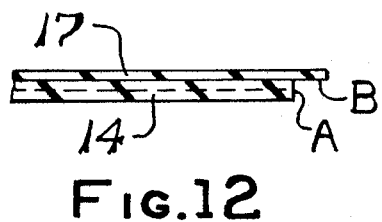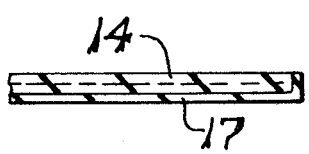
Fig.12     Fig.13
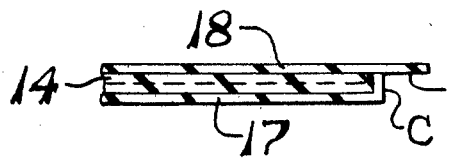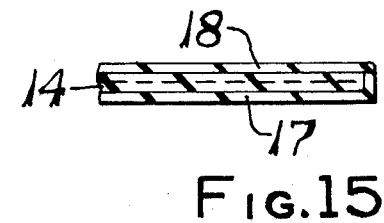
Fig.14     Fig.15

BELT COVERING APPARATUS

CROSS REFERENCE TO RELATED APPLICATION

This application is a division of U.S. Pat. application Ser. No. 204,931, filed Dec. 6, 1971 now U.S. Pat. No. 3,775,221.

BACKGROUND OF THE INVENTION

This invention relates to the manufacture of conveyor belts and more particularly to a method for covering a belt carcass of multiple ply construction.

It has been the practice in constructing a conveyor belt where the overall length is over 300 feet, to construct such belt in a piecemeal manner. This is done by first separately calendering uncured rubber stock into long thin strips which are rolled with a liner onto a storage reel. Several of these reels are prepared for the covering operation of a single carcass. A belt carcass, to be covered, is then unrolled from its storage reel and a portion thereof is positioned onto an elongated table. A thin rubber strip from a storage reel is then positioned onto the unrolled portion of the carcass. The carcass and covering are then moved linearly past an operator's station, whereat an operator trims the edges of the rubber strip. The operator then directs the carcass and rubber strip between a pair of squeeze rolls for uniting the two. Since the lengths of rubber strips must be limited due to its bulky nature, numerous interruptions in the making of the belt must be necessary including the removal of the empty rubber strip reel and the substitution of a full roll of thin rubber strip stock. With each substitution there must be a splice between the trailing edge of the previous rubber strip with the leading edge of the subsequent strip. In the manufacture of a belt of one thousand feet length and about 72 inches wide there must be at least six splices entailing six separate interruptions in manufacturing so that the rolls may be manipulated, transferred, and relocated. The lap splice in itself is undesirable and provides for an uneven heavier section along with the potential of creating air pockets between the carcass and covering material which would result in ply separation and belt failure. Thereafter the belt under construction is rewound to invert such carcass so that the additional layer or layers of uncured rubber stock may be unrolled and positioned onto the remaining side of the carcass. The margins of the additional uncured layer are turned down over, and skived so as to present a flush upper surface. Where a long belt is to be constructed, the operation is done in stages as referred to above. If the thickness of the belt requires several additional plies of uncured rubber to provide a suitable thickness, then additional passes and manipulation must be done to properly build up the plies. Where long belts are to be constructed then the additional problems of splicing must be considered to adequately provide for the necessary length. The table which handles the belt carcass must be extremely long and is generally inadequate therefore requiring that the belt be constructed in stages. Besides the time lost in inverting the belting and the labor involved, considerable unproductive effort is expended in the manufacturing of such belts.

The general purpose of this invention is to eliminate the need for splicing the several lengths of covers of long conveyor belt carcasses thereby making a better quality belt while reducing the number of manual operations necessary as well as personnel that are required to make long conveyor belts. Considerable time is saved by the apparatus of such invention thereby making it more economical to manufacture long conveyor belting.

BRIEF SUMMARY OF THE INVENTION

The present invention is directed to a method for fabricating a belt wherein a belt carcass to be covered is conveyed in line with an extruder. The extruder extrudes a thin continuous sheet of elastomeric stock that is trimmed and cooled to a predetermined temperature and fed through a roller die to provide a predetermined thickness after which such sheet stock is fed onto the moving carcass, after which they are passed between a pair of squeeze rolls for laminating the stock to the carcass and thence wound up onto a storage reel. The carcass with one side covered is then reversed and passed back through a similar procedure such that the newly extruded stock from the extruder is positioned on the noncovered side of the carcass to completely cover the carcass. During such covering process the carcass and covering are then passed to a set of laminating rolls where they are laminated together and thereafter such covered belt is pricked to prevent the formation of air bubbles, dusted, and thence wound up on a storage reel for vulcanization.

BRIEF DESCRIPTION OF THE DRAWINGS

FIGS. 1 and 2 are schematic longitudinal views with portions broken away of the belt covering apparatus which when longitudinally aligned show the entire apparatus of this invention;

FIG. 5 is a plan view of the edge trimmers and turn up apparatus;

FIG. 6 is a side elevational view of the edge trimmers and turn up apparatus;

FIG. 10 is an enlarged cross-sectional view of the guide rollers and rail for the bridging conveyor of FIG. 4;

FIG. 11 is a simplified plan view of a storage reel and the mechanism for rotating such reel and support 180°;

FIG. 12 is a cross-sectional view of a portion of the belt carcass with a top ply of stock material;

FIG. 13 is a cross-sectional view of a portion of the belt carcass of FIG. 12 with the carcass inverted showing the top ply turned up;

FIG. 14 is a cross-sectional view of a portion of the belt carcass encased within plies of stock material;

FIG. 15 is a cross-sectional view of a portion of a completed carcass that is covered by a single layer of ply stock, with side edges trimmed.

DETAILED DESCRIPTION

Figure 3:
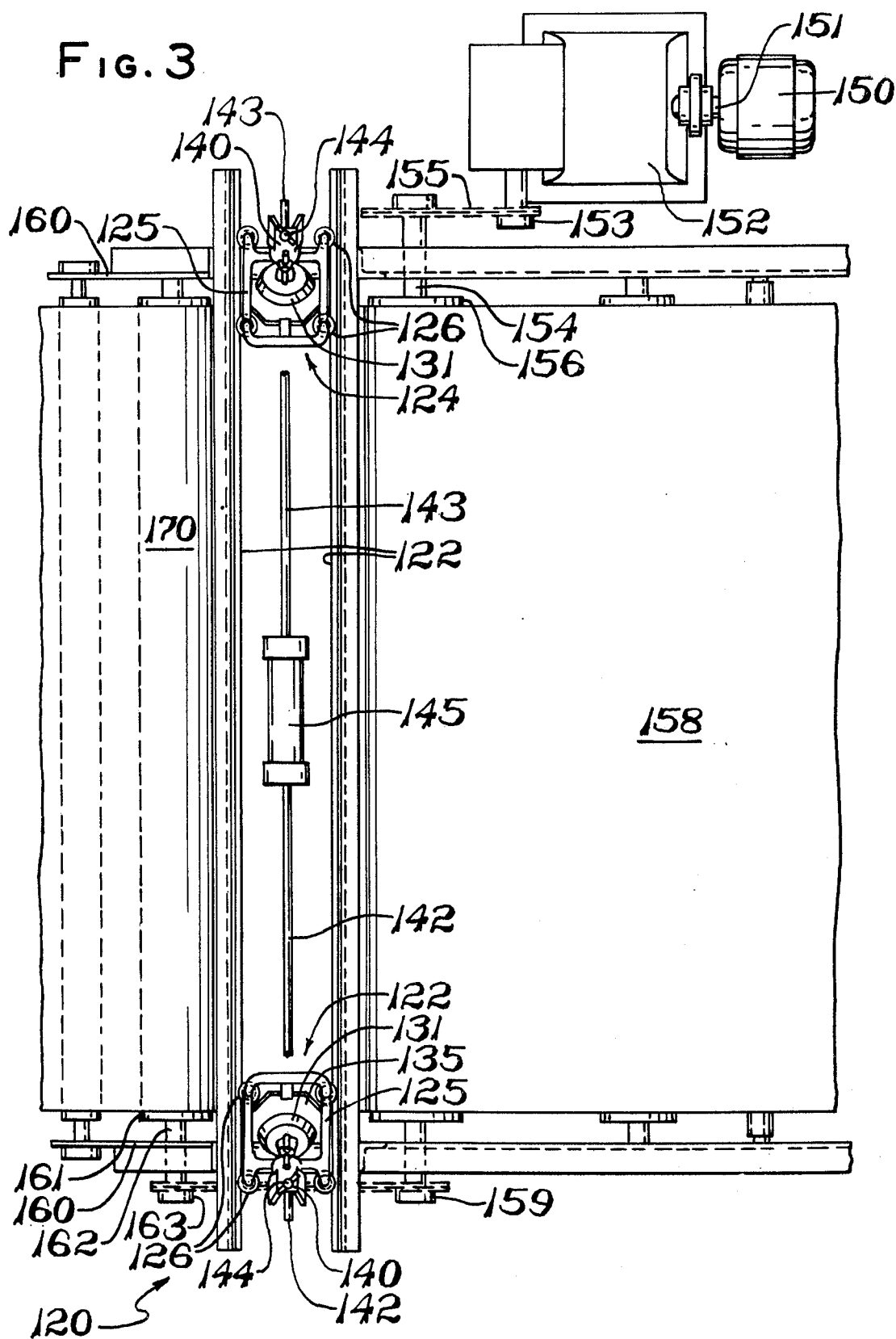
FIG. 3 is a plan view of the carriage that carries the cementers used in the belt covering apparatus of FIG. 1.

Referring to the drawings wherein like characters designate like elements throughout the several views there is shown in FIGS. 1 and 2, which Figures when longitudinally aligned present the entire apparatus as a continuous machine, a base 10 which supports a plurality of vertically extending brackets 11. A pair of laterally spaced journal boxes 12 are mounted on the brackets 11. Throughout the description reference will be made to a plurality of elements or a pair of elements; however, since FIGS. 1 and 2 are side elevational views only, one element will appear and it is to be understood that the other element is on the other side of the apparatus. Journal boxes 12 support for rotation a reel 13 containing a large roll of carcass material 14 which is suitably wrapped in a liner 15. As shown in FIG. 1, the liner 15 on being separated from the carcass material 14 is wound onto a take-up reel 16. Shown schematically in FIGS. 1 and 2 is an endless belt 20 supported by suitable support means in a manner well known in the art, which support means includes end rollers 21 and 22. Closely adjacent to reel 13 is a dusting unit 25 containing a roller 26 which is adapted to guide belt material therethrough for dusting such belt on the return run for a purpose to be described. Mounted on support means not shown is a pricker roll 27, having a plurality of radially extending needles mounted thereon which engage the belt material as it moves out of the dusting unit 25 for piercing the belt carcass and covered material thereon prior to wind-up onto reel 13. Located between pricker roll 27 and reel 13 is a dancer unit 28 containing a roller 29 that is movable vertically along suitable guide means, such that a sensor is operable to actuate a motor to move the roller 29 of dancer unit 28 as well as controls the speed of rotation of the motor that rotates reel 13 to maintain proper tension and provide sufficient speed to the reel 13 for the wind-up operation. The vertically driven roller 29 is movable through suitable limits and its operation is well known and understood by those skilled in the art. A roller 30 is mounted closely adjacent to one side of dancer unit 28 to facilitate the movement of the belt carcass and material from the dancer unit 28 for wind-up onto the reel 13. A pair of rollers 31 and 32 are mounted closely adjacent to the other side of dusting unit 25 and are employed to direct the belt material from the endless conveyor 20 for movement to the dusting unit 25 on the return pass in a manner to be described. Mounted closely adjacent to the dusting unit 25 are a pair of vertically extending standards 35 which straddle the endless belt 20. Such standards 35 support for rotation a pair of roller dies 36–37, which roller dies 36–37 are vertically adjustable to maintain a predetermined clearance space therebetween for maintaining a predetermined pressure on the stock to be processed to assure a predetermined thickness of elastomeric material. Suitably adjustably mounted on standards 35 are a pair of laterally spaced knives 34 (only one shown in FIG. 2) which trims the width of the sheet stock coming from the roller dies 36–37. Located between standards 35 and roller 31 is an extruder 38 suitably supported (schematically shown in FIG. 2) having a hopper 39 and a die head 40, which die head 40 is located closely adjacent to the bight portion of roller dies 36–37. Suitable means not shown are provided to convey strips of elastomeric material directly to the hopper 39 for processing by the extruder 38. Located forwardly of the standards 35 are a pair of vertically extending support means 41, which support a thickness gauge control means 42. Gauge control means 42 measures the thickness of the material being processed by the roller dies 36–37 and provides either a manual or an automatic feedback to the cylinders 33, which cylinders 33 control roller dies 36–37 to maintain the predetermined clearance space between such roller dies 36–37 in a manner well known in the art. Such extruder and roller dies 36–37 are referred to as extruder die means. Suitable roller means, such as roller 43, are located between the roller dies 36–37 and the thickness gauge control means 42 to support the sheet stock as it is moving from the roller dies 36–37 to the gauge control means 42.

A cooler unit 50 mounted forwardly of the thickness gauge control means 42, receives the sheet stock from the gauge control means 42 and cools such stock. Cooler unit 50 has a plurality of spaced pair of rollers 51–52, 53–54, and 55–56. Trained about rollers 51–52 is an endless belt 57. Similarly rollers 53–54 and 55–56 have trained about them endless belts 58 and 59 respectively. Additional rollers and endless belts may be provided if desired to provide for additional cooling. The conveying run of endless belt 57, which is the upper run, will deposit the sheet stock from the extruder die means onto the endless belt 58 of rollers 53–54, with the sheet stock being conveyed therefrom onto the upper run of endless belt 59 of rollers 55–56. The operator selectively determines the length of cooling by moving such stock through selective portions of the cooler unit 50. Cooler unit 50 is enclosed and has suitable means for controlling the temperature of the surrounding atmosphere and thereby the material passing therethrough. Suitable roller means are placed between the gauge control means 42 and the cooler unit 50 to direct the stock from the gauge means 42 to the cooler unit 50. Only one of such rollers is shown as 60 in FIG. 2.

Figure 4:
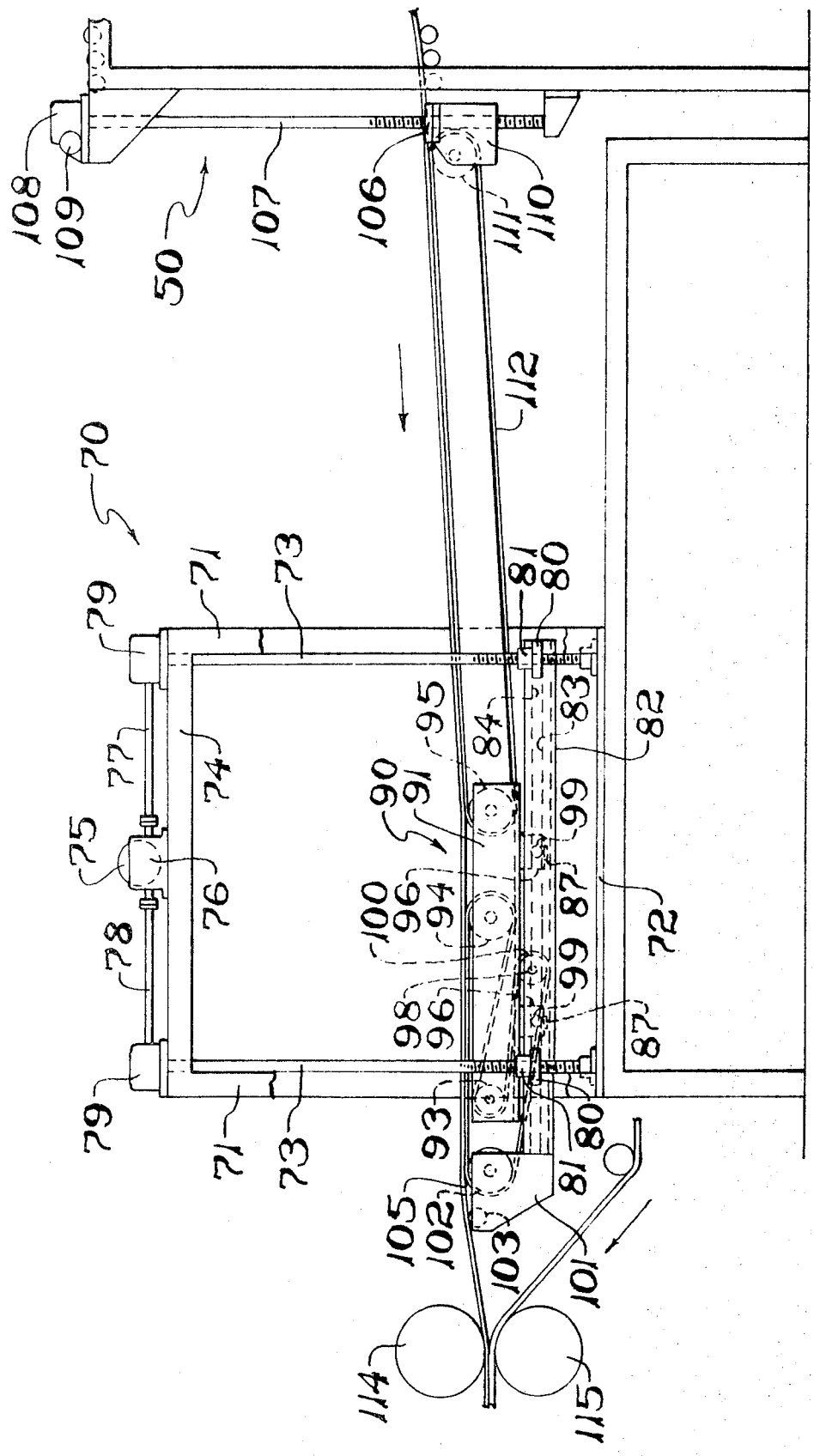
FIG. 4 is a side elevational view of a transfer conveyor located between the cooler unit and the laminating rolls.

A transfer conveyor unit 70 is located adjacent to cooler unit 50 and is adjustable in a vertical plane. With such vertical adjustment of transfer conveyor unit 70 the operator is ablt to remove the sheet stock from the cooler unit 50 either from conveyor belt 57 or conveyor belt 59, as determined by the position of the right hand portion of the transfer conveyor unit 70 as viewed in FIG. 1. Transfer conveyor unit 70 has four vertically extending brackets 71 (only two shown in FIGS. 1 and 4) with such vertically extending brackets 71 being interconnected by a pair of side brackets 72. Mounted closely adjacent to the respective brackets 71 are vertically disposed lead screws 73, wherein such lead screws are journaled on such brackets 72 and an upper bracket 74. A motor 75 is mounted on one of the upper portions of brackets 74. The output of motor 75 is connected to transmission means 76 which has its output connected via shafts 77 and 78 to lead screws 73 via right angle drive means 79. Extending along the respective side portions of transfer conveyor unit 70 are a pair of laterally spaced angle irons 82. One of such angle irons shown in cross-section in FIG. 10, and in side elevational view in FIG. 4. The respective end portions of each angle iron 82 has a bracket 80 suitably secured thereto. A nut 81 is secured to each bracket 80. Each nut 81 meshes with and threadedly engages lead screw 73. The energization of the motor 75 rotates the respective lead screws 73 such that angle brackets 82 moves upwardly or downwardly in accordance with the direction of rotation of lead screws 73. Extending longitudinally along the inner side portion of angle iron 82 (FIG. 10) are a pair of spaced guidebars 83 and 84 defining a recess or guide means 85 therebetween, which guide means receives rollers 99. Mounted for longitudinal movement on transfer conveyor unit 70 is a carriage 90 shown generally in FIG. 4, wherein such carriage 90 includes a pair of spaced angle irons 91 (only one shown in FIG. 4). Extending laterally between the respective angle irons 91 is a roller 93 having its respective end portions journaled in bushings 92 suitably secured to the angle iron 91. Extending downwardly from the respective lower edge portion of angle iron 91 is a bracket 96. Bracket 96 has a roller 87 journaled on its lower most end portion, which roller 87 is in rolling engagement with one side surface of guidebar 83. Journaled for rotation between a pair of downward extending brackets 96 of carriage 90 is a laterally extending shaft 98 (FIG. 4), which shaft 98 has secured to its respective end portions spur gear 97 which meshes with a rack 88 secured to angle iron 82. Such action assures proper alignment and movement of the carriage 90. The outermost end portion of shaft 98 has the roller 99 journaled thereon for rolling engagement with the respective side surface of recess 85 to assure alignment of the shaft 98. Mounted on carriage 90 are additional rollers 94 and 95 (FIG. 4) having their axes in parallel alignment with roller 93 for a purpose to be described. Carriage 90 has a plurality of brackets 96 (FIG. 4) which are longitudinally spaced such that rollers 99 will engage the recess or guideway 85 to facilitate the movement of carriage 90 on the guideway 85. Suitably journaled on the laterally spaced angle irons 91 are a pair of brackets which support an idler roller 100 (FIG. 4). A pair of brackets 101 (only one shown in FIG. 4) are suitably connected to angle irons 82, respectively, and such brackets 101 support for rotation rollers 102 and 103. Belt 105 is trained about rollers 93, 94, 102, and 100 presenting an upper conveying run between rollers 100 and 102. One end of cooler unit 50 supports a pair of lead screws 107 suitably connected through transmission means 108 to a motor 109. A pair of laterally spaced brackets 110 suitably interconnected support for rotation a roller 111. Each bracket 110 has mounted on its upper end portion a nut 106 which threadedly engages lead screw 107. Energization of motor 109 rotates lead screws 107 and moves the respective brackets 110 upwardly or downwardly in accordance with the direction of rotation of lead screw 107. An endless conveyor belt 112, trained about rollers 111 and 95, is operative to convey the stock material from the cooling unit 50 to the conveying run of belt 105 on carriage 90. Energization of motor 109 will move the roller 111 selectively to take off the stock material from conveyor belt 57 or conveyor belt 59, whereas energization of motor 75 will move the conveying run of belt 105 upwardly or downwardly to position the sheet stock issuing therefrom into the bight portion of a pair of laminating rolls 114 and 115 or to the uppermost end portion of the upper laminating roll 114, such that the stock will travel around the upper roller 114 and enter the bight portion of the laminating rolls 114 and 115 from the left side as viewed in FIG. 1. Laminating rollers 114 and 115 are mounted on suitable columns 116 with suitable means connected to such laminating rollers to provide the necessary pressure for the laminating process to be described. Means are also provided to selectively open the rolls 114, 115 to facilitate the positioning of material therethrough to facilitate the start-up of the belt laminating process.

Figure 8:
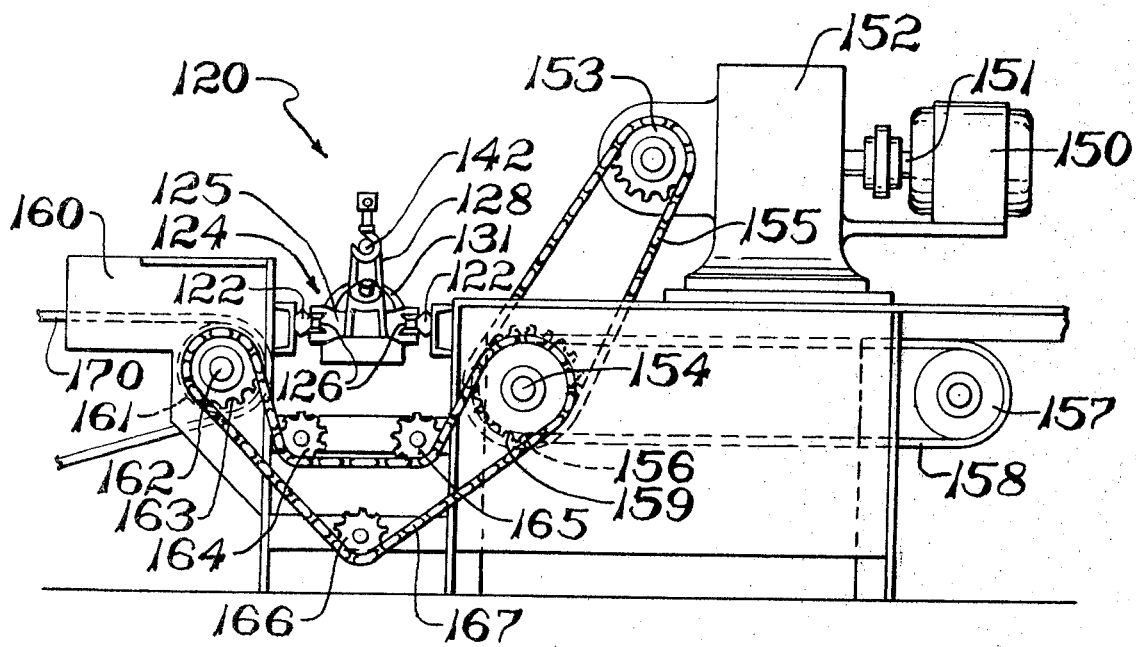
FIG. 8 is a side elevational view of the cementer unit and drive means for the conveyor.
Figure 9:
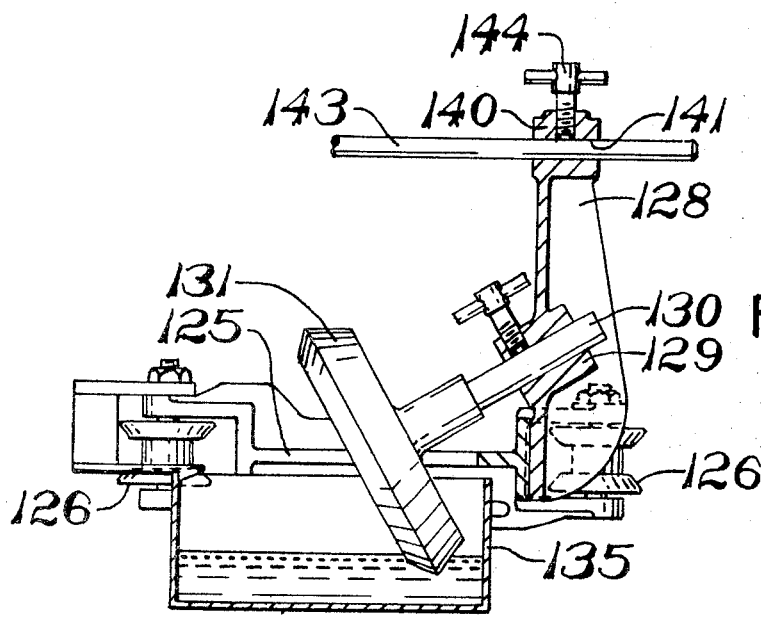
FIG. 9 is an enlarged cross-sectional view of the cementer.

Mounted closely adjacent to laminating rolls 114 and 115 is a cementer unit 120. Extending across the conveying apparatus to be described and supported by suitable framework are a pair of guide rails 122 (FIGS. 3 and 8). A pair of spaced carriages 124 are arranged for movement along the guide rails 122. Each carriage has a rectangular-shaped frame 125, which, as shown in plan view in FIG. 3, supports a plurality of rollers 126. Each roller 126 is beveled to captively engage the rail 122 since the rails 122 are beveled and the roller is contoured to complement the shape of the guide rail. Suitably secured to each carriage 124 is a vertically extended plate member 128 (FIG. 9) which supports a lower boss member 129. Boss member 129 supports a shaft 130, which shaft 130 has journaled on its lower most end portion a beveled roller 131. A rectangular-shaped tank 135 is suitably secured to each carriage 124 such that the lower portion of the roller 131 continuously rotates through such tank. With such tank filled with a liquid cement and with the roller 131 rotating through such cement, a smooth coating is applied to the edges of a belt carcass and the edges of sheet stock in a manner to be described. The upper end portion of plate member 128 has a boss member 140 with a horizontally extending bore 141 therethrough. The respective carriages 124 are tied together for simultaneous movement by a pair of tie rods 142 and 143 (FIG. 3). The respective one ends of tie rods 142 and 143 are suitably secured to the bosses 142 of carriages 124 by set screws 144 while their other ends are interconnected by a tension tube 145 such that a tension spring located within such tube is suitably compressed to maintain rollers 131 of carriages 124, in contact with the edges of the belt carcass and sheet stock. Thus the contoured surface of roller 131 presses against the edges of the carcass and the sheet stock and will move laterally in unison therewith as such sheet stock and belt carcass passes by the roller 131. The basic width of the belt being worked on determines the position of the respective carriages 124, which carriages may be adjusted along the tie rod 142 and 143 by loosening the set screws 144 and moving such carriages 124 to their desired position or location and securing the respective carriages to the tie rods by the manipulation and locking of the carriages to the tie rods. Such carriages 124 move in unison with sufficient resiliency therebetween to assure a firm contact with the edges of the belt carcass and the sheet stock.

Mounted on the support frame of cementer unit 120 is a motor 150 whose output is connected by a shaft 151 to transmission means 152. The output of transmission means 152 is connected to a sprocket 153 (FIGS. 8 and 3). Sprocket 153 drives a shaft 154 by a chain 155. Shaft 154 supports for rotation roller 156. An idler roller 157 is suitably mounted adjacent to the laminated rolls 114 and 115 such that an endless belt 158 trained about the respective rolls 157 and 156 provides an upper conveying surface which is in line with the bight portion of rolls 114 and 115. The one end of shaft 154 has keyed to it sprocket 159 for a purpose to be described.

As shown in FIG. 8 mounted adjacent to cementer unit 120 is a pair of spaced brackets 160 journaling for rotation a roller 161. Roller 161 is keyed to a shaft 162 which has keyed to one end thereof a sprocket 163.

Idler sprockets 164, 165, and 166 are mounted on suitable brackets located on the framework of cementer unit 120 such that a sprocket chain 167 is adapted to be trained about sprockets 159, 166, 163, 164, and 165. The output of motor 150 drives endless belt 158 and an endless belt 170 which is trained about roller 161 which is driven by sprocket chain 167.

Mounted adjacent to cementer unit 120 is a fold-up and trimmer unit 171. Such fold-up and trimmer unit has a plurality of vertically extending supports 172 with suitable cross braces including a pair of spaced brackets 173 (only one shown in FIG. 6). A plurality of guide rollers 175, 176, 177, and 178 are journaled for rotation on the side plates 179, which plates 179 are suitably attached to vertical supports 172 and cross brackets 173. The respective outer end portions of the framework fold-up and trimmer unit 171 (FIG. 1) supports a plurality of rollers 180, 181, 182 and roller 161 previously referred to and disclosed in FIGS. 1 and 8. The endless belt 170 trained about roller 161 has its upper conveying run trained about roller 178, thence downwardly along the outer lower periphery of roller 177, thence to roller 176 and thence over the outer periphery of roller 175 such that the conveying run of the belt 170 is in line with the bight portion of rollers 114 and 115 and thereafter such belt is trained about rollers 180, 181, and 182 for movement back around roller 161. Mounted on cross brackets 173 are a pair of laterally spaced vertically extending brackets 183 and 184 supporting rollers 185 and 186 which rollers have their upper tangential surface in line with the upper conveying surface of belt 170. Although only two rollers 185 and 186 are shown, a plurality of such roller may be employed depending on the spacing required between the rollers 185 and 186. Mounted on the upper surface of the spaced brackets 173 and extending laterally therebetween are a pair of angle irons 190 and 191. Such angle irons have suitably secured thereto a guide bar 192 to provide means for accurately guiding a pair of carriages 195 which, as shown in FIG. 5, are spaced laterally. Such carriages 195 are adjustable toward and away from each other by a tie rod which is shown generally in FIG. 6 as element 197 and wherein such tie rod may be similar to tie rods 142 and 143, shown in FIGS. 3 and 9 such that the respective carriages 195 will move as a unit in accordance with the drift of the carcass and sheet stock across conveyor belt 170. Mounted on respective carriages 195 are a plurality of pneumatic control cylinders 198 whose piston rods are suitably connected to brackets which support a plurality of contoured rollers 200, 201, 202, 203, and 204 which are adapted to fold a horizontally extending edge of material upwardly and around a belt carcass which is depicted by FIGS. 12 and 13. Such pneumatic cylinders 198 are adjustable with respect to their tension to provide a bias onto respective rollers 200 through 204 to assure a firm contact with the edge of the sheet material that is to be turned around the edge of the belt carcass. The brackets which support such rollers 200 through 204 are suitably guided in their movement toward and away from the belt carcass that is being processed to assure proper alignment and contact with the edge of the sheet material. Carriages 195 have suitable brackets 205 secured thereto, which brackets 205 have rollers journaled thereon for rolling engagement with guidebar 192. Mounted on carriage 195 closely adjacent to roller 186 as shown in FIG. 5 are a pair of vertically extending brackets 206 and 207 which support laterally extending knives 208 and 209 which may be electrically heated and as shown suitably notched to properly engage the edge of a sheet stock that is extending above the belt carcass to accurately trim such excess stock therefrom.

A base 210 supports a turntable 211 which is pivotally mounted thereon about pivot means 212. Turntable 211 is supported by a plurality of rollers 213 which are adapted to ride on suitable tracks. A pair of laterally spaced bearing units 214, suitably mounted on turntable 211, supports for rotation a storage reel 215. Base 210 supports a liner wind-up reel 216 such that as a belt carcass is wound up onto reel 215, a liner 217 is pulled from reel 216 to assure that the tacky belt carcass will not adhere to itself. A motor 218 (FIG. 11) is mounted adjacent to turntable 211 having its output connected to transmission means 219. Transmission means 219 has its output connected to a pulley 220. A chain 222 suitably trained about pulley 220 and an idler pulley 221 has its respective ends connected to spaced portions of the turntable 211 such that turntable is rotatable 180° between a pair of limits such that the belt carcass wound thereon can be inverted and unwound therefrom in a manner to be described. Suitable limit switches control the limits of rotation of such turntable 211.

Mounted between fold-up trimmer unit 171 and the turntable 211 is a compensator 225 (which is shown schematically in FIG. 1). Compensator 225 controls the speed of rotation of reel 215 which thereby controls the tension of the carcass as it is wound up onto such reel 215. Such conpensator includes a cylinder unit 226 operating on roll 227 to control the pressure thereon.

Figure 7:
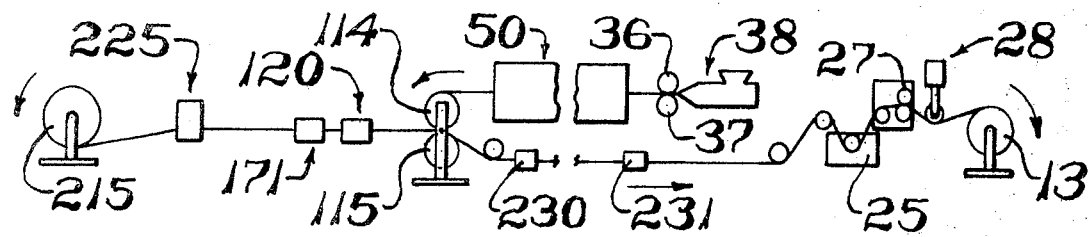
FIG. 7 is a schematic view of the belt covering apparatus with details omitted for clarity, and with the belt carcass moving left to right.

A second cementer unit 230 similar in all respects to cementer unit 120 is located beneath transfer conveyor unit 70 to operate on the pass line of endless belt 20 such as to work on the belt carcass and covering as such material is moving from left to right in FIG. 7. Such compensator may or may not be employed as desired. In addition, a fold down and trimmer unit 231 similar in all respects to fold up and trimmer unit 171 described above except that the rollers therein turn down the edges of the sheet stock rather than fold up, is located on the pass line of the endless belt 20 between cooler unit 50 and vertically extending support means 41. Where desired on such second pass, the extruded stock is trimmed to the exact size prior to lamination and then no trimming is required by unit 231. Further cementer unit 230 may not be employed and only trimmer unit 231 employed.

In the operation of the apparatus described assuming that the roller dies 36 and 37 are set to the proper opening for the desired thickness of stock or sheet material in conjunction with the proper head for extruder 38, and with a suitable leader attached to the forward and rearward ends of the carcass to be covered, such leader or carcass end is unrolled from the let-off and wind-up reel 13 and thence fed onto the web of the endless belt 20 while the liner of carcass is fed onto take-up reel 16. As the forward end of the carcass or leader approaches the bight of the laminating rolls 114 and 115, a thin, continuous sheet of elastomeric stock issues from extruder 38, which stock is controlled as to thickness by roller dies 36 and 37. Elastomeric material from a suitable source is conveyed to extruder 38 to assure a continuous uninterrupted flow from the extruder. Such stock is trimmed by the laterally spaced knives 34 to obtain the desired width of stock, which stock is thence conveyed through the cooling unit 50 (whose temperature has been set to assure a predetermined temperature of the stock) for deposit onto the transfer conveyor unit 70. Transfer conveyor unit 70 conveys the thin sheet stock onto the carcass to be covered, which sheet stock and carcass are laminated together as they pass through laminating rolls 114 and 115. The laminated top sheet of stock 17 and carcass 14 which is shown in cross-section in FIG. 12 is thence directed onto the conveying run of endless belt 158 for conveyance past the cementer unit 120 wherein the contoured roller 131 comes into firm contact with the respective edges A and B of the carcass and sheet material stock as shown in FIG. 12, coating such surfaces with a suitable layer of adhesive. The sheet stock material and carcass is thence conveyed by conveyor 170 past the compensator 225 for wind-up on the reel 215. After covering the upper surface of the belt carcass and such carcass is completely rolled onto reel 215, reel 215 is rotated 180°, such that the belt carcass is inverted and is then fed rightwardly as shown in FIG. 1 thereby presenting onto conveyor 170 the carcass 14 whose upper surface is not covered and wherein such sheet stock material 17 is on the lower surface portion of conveyor 170. Conveyor belt 170 moves such belt carcass past the fold-up and trimmer unit 171 such that the respective edges B of the sheet stock is turned upwardly over the side edge of the belt carcass with the excess portion thereof being trimmed off by knives 208 and 209. Such belt carcass is then fed and conveyed by endless belt conveyor belt 170 to the bight portions of rollers 114 and 115. Simultaneously with such action the extruder 38 extrudes a thin sheet of stock that is deposited onto the transfer conveyor unit 70, which conveyor at this point is elevated through the energization of motor 75 and via transmission 76 and screws 73 which elevates the carriage 90 of such transfer conveyor unit upwardly as shown in FIG. 4 to a position wherein such sheet stock can be fed to the upper outer periphery of roller 15 as shown in FIG. 7 wherein such sheet stock 18 is deposited on the upper surface of the belt carcass whereby the carcass is completely encased and covered by such sheet stock. Rolls 114 and 115 laminate such sheet stock 18 firmly and securely to the belt carcass and thereafter such covered belt is directed downwardly onto endless conveyor 20 wherein a second trimmer unit designated as element 231 in FIG. 2 similar in all respects to the previously described trimmer unit, except that the knives are adjusted to perform a vertical cut whereby the belt carcass is suitably trimmed as depicted by FIG. 15 such that the outstanding edge portion of the sheet stock is removed and the sheet stock completely encases the belt carcass. If desired the cementer unit 230 may be employed to coat surfaces C and D and thereafter the fold-down and trimmer unit 231 utilized. Thereafter such covered belt is moved over roller 31 into the duster unit 25 after which such covered belt is vented by pricker unit 27 and thereafter wound up onto storage reel 13.

Although a specific embodiment and a preferred mode of operation of the invention has been described it is to be understood that the subject invention is not limited thereby since variations and modifications thereof can be made without testing from the principle of the invention as set forth above.

We claim:

1. The method of covering a belt carcass comprising the steps of directing a belt carcass from a first storage reel toward a second storage reel; extruding a first thin continuous sheet of elastomeric material; cooling said first continuous sheet of material; laminating said cooled sheet of material directly to one of the surfaces of said moving belt as said carcass moves to said second reel; winding up said belt carcass with said sheet of laminated material thereon onto said second storage reel whose axis of rotation is horizontal and parallel to the axis of rotation of said first reel; pivoting said second reel 180° about a vertical axis that passes through the midpoint of said axis of said second reel; directing said wound up carcass from said second storage reel toward said first reel, with said one surface being the lower surface; extruding a second thin continuous sheet of elastomeric material; cooling said second thin sheet of elastomeric material; laminating said last mentioned extruded sheet of elastomeric material onto the other surface of said carcass to form a laminated belt; and winding up said covered belt carcass onto said first storage reel.

2. The method of covering a belt carcass as set forth in claim 1 wherein the respective steps of said cooling is to substantially cool said extruded sheets of elastomeric material prior to said laminating steps.

3. The method of covering a belt carcass as set forth in claim 1 wherein an adhesive is applied to the respective lateral edges of said carcass and the lateral edges of said first sheet of material prior to wind up onto said second storage reel; folding up the respective side edges of said first sheet material onto the side edges of said carcass after said carcass is being unwound from said second storage reel; applying an adhesive to the edges of said laminated belt and the laterally outwardly extending edges of said second sheet of material after the lamination of said second sheet of material to said carcass; folding down of said outwardly extending edges into abutting contact with said carcass edges having adhesive thereon; and trimming the excess of said outwardly extending edges of said sheet that extends beyond said carcass edge after said folding.

4. A method for covering a belt carcass comprising the steps of providing a wound-up belt carcass on a first reel; unwinding such belt carcass from said first reel toward a second reel wherein said first reel and said second reel have horizontal, parallel axes; extruding a first continuous thin sheet of elastomeric material; squeezing said sheet of elastomeric material by roller die means into a predetermined thickness; cooling said sheet of elastomeric material; laminating said cooled sheet of material to one of said surfaces of said belt carcass to provide a partially laminated belt carcass; winding up said partially laminated belt carcass to said second reel; pivoting said second reel 180° about a vertical axis that is the midpoint of said second reel to invert said belt carcass for wind-up onto said first reel such as to present a horizontally disposed upper uncovered surface as said carcass is conveyed toward said first reel; extruding a second continuous sheet of elastomeric material; squeezing said second sheet by roller die means to a predetermined thickness; cooling said second sheet of material; directing said second sheet of elastomeric material to said upper uncovered surface for deposit thereon; laminating said sheets of elastomeric material to said carcass to form a fully covered belt; and winding up said covered belt onto said first reel.

* * * * *